US005924840A

United States Patent [19]

Charron et al.

[11] Patent Number: 5,924,840

[45] Date of Patent: Jul. 20, 1999

[54] METHOD OF EXTRACTING CONTENTS FROM ENVELOPES

[75] Inventors: William F. Charron, Fremont; Edward A. Krupotich; George H. Bingham, both of Los Altos; James R. Sencenbaugh, Redwood City, all of Calif.

[73] Assignee: Opex Corporation, Moorestown, N.J.

[21] Appl. No.: 07/949,042

[22] Filed: Sep. 22, 1992

Related U.S. Application Data

[62] Division of application No. 07/695,435, May 3, 1991, Pat. No. 5,156,515, and a continuation of application No. 07/346,647, May 3, 1989, abandoned.

[51] Int. Cl.[6] .......... B65G 1/00

[52] U.S. Cl. .......... 414/802

[58] Field of Search .......... 414/786, 403, 414/411, 412, 416; 83/100, 107, 162, 165, 425.2, 912; 209/615, 616, 654; 271/2, 161, 283, 262; 53/381.1, 381.2, 381.3, 382, 391, 492

[56] References Cited

U.S. PATENT DOCUMENTS

| | | | |
|---|---|---|---|
| 3,143,100 | 8/1964 | Krupotich | 83/912 X |
| 3,238,926 | 3/1966 | Huck | 83/912 X |
| 3,384,252 | 5/1968 | West | 414/412 |
| 3,726,454 | 4/1973 | Robbins | 83/912 X |
| 4,016,708 | 4/1977 | DeHart | 83/912 X |
| 4,123,890 | 11/1978 | Russell et al. | 53/381.3 X |
| 4,139,977 | 2/1979 | Russell | 53/77 |
| 4,295,321 | 10/1981 | DeHart et al. | 53/381.6 |
| 4,353,197 | 10/1982 | Stevens et al. | 53/492 |
| 4,576,287 | 3/1986 | Bingham et al. | 271/262 X |
| 4,747,817 | 5/1988 | Newsome | 271/216 X |
| 4,921,388 | 5/1990 | Nelson | 83/912 X |

*Primary Examiner*—Stephen T. Gordon
*Attorney, Agent, or Firm*—Flehr Hohbach Test Albritton & Herbert LLP

[57] ABSTRACT

Machine and method for extracting the contents from envelopes for presentation to an operator. The envelopes are stacked at an input station and fed one at a time from the input station to a cutting station. At the cutting station, the envelopes are severed along their edge portions to provide access to the contents. From the cutting station, the envelopes are transported to a separating station, where the contents are separated from the envelopes. The contents from one envelope at a time are conveyed to a pick-up station for presentation to an operator at a work station. When the operator removes the contents of one envelope from the pick-up station, the contents of another envelope are conveyed to that station and presented to the operator. As each envelope leaves the separating station, it is checked to verify that the contents have been removed.

21 Claims, 10 Drawing Sheets

METHOD OF EXTRACTING CONTENTS FROM ENVELOPES

This is a division of Ser. No. 07/695,435, filed May 3, 1991, now U.S. Pat. No. 5,156,515, and a continuation of Ser. No. 07/346,647, filed May 3, 1989, now abandoned.

This invention pertains generally to mail processing equipment and, more particularly, to a machine and method for extracting contents from envelopes for processing by an operator.

Many banks and other businesses receive monthly payments from their customers through the mail in the form of checks and payment coupons in envelopes which they have provided. In order to process large volumes of such mail efficiently, a number of machines have been provided to open the envelopes and facilitate the removal of the contents therefrom. All of the machines heretofore provided for this purpose, however, have had certain limitations and disadvantages.

U.S. Pat. Nos. 3,979,884, 4,139,977, 4,159,611, 4,271,656, 4,319,444 and 4,333,300 disclose envelope processing machines in which the envelopes are serially presented to a station in the machine where the contents are manually removed by an operator. The front and rear panels of the envelopes are held apart by suction cups to make it easier for the operator to grasp the contents. These machines generally cannot deliver the contents to a station located on or above the operator's desk or other work station, and the operator must turn away from the desk or work station in order to get to the station where the contents are presented. In addition, the operator must manually remove the contents from the envelopes.

U.S. Pat. No. 3,884,010 discloses an envelope opening and emptying machine which cuts off the two ends of an envelope, then turns the envelope to a vertical position so that the contents will fall out by gravity.

U.S. Pat. Nos. 3,797,350, 4,527,455 and 4,553,459 disclose machines for opening envelopes. In U.S. Pat. No. 3,797,350, the envelopes are conveyed in successive order transversely through the teeth of a cutter similar to a circular saw blade to cut open one edge of each envelope. In U.S. Pat. No. 4,527,455, the ends of the envelopes are cut off in a shearing action by knife blades, and in U.S. Pat. No. 4,553,459 the envelope is rotated to present successive edges to a cutter.

U.S. Pat. Nos. 4,016,708 and 4,295,321 disclose envelope opening machines having an extractor for removing contents from envelopes. In U.S. Pat. No. 4,016,708, the envelopes are opened by a so-called "chadless cutter" which cuts through only one panel of each envelope, with the other panel remaining intact, while in U.S. Pat. No. 4,295,321, the ends of the envelopes are severed by cutting wheels in a shearing action. In both patents, the envelopes are separated from the contents by a vacuum drum, and the contents are discharged toward the front of the machine, where they are picked up manually by the operator.

In order to avoid inadvertently throwing away checks or payment coupons with the envelopes, some machines have been provided with means for checking the envelopes before they are discarded to make certain that they are empty. U.S. Pat. No. 4,113,105 discloses a device for detecting the presence of contents by the opacity of the envelopes, and U.S. Pat. No. 4,576,287 discloses a machine for detecting contents by the thickness of the envelopes.

It is in general an object of the invention to provide a new and improved machine and method for extracting contents from envelopes and presenting the same to an operator.

Another object of the invention is to provide a machine and method of the above character which overcome the limitations and disadvantages of extracting machines heretofore provided.

Another object of the invention is to provide a machine and method of the above character in which the contents are presented to an operator at his/her own work station so that the operator does not have to leave that station in order to process the contents.

These and other objects are achieved in accordance with the invention by stacking the envelopes to be processed at an input station, feeding the envelopes one at a time from the input station to a cutting station, severing the envelopes along edge portions thereof at the cutting station to provide access to the contents, transporting the envelopes from the cutting station to a separating station, separating the contents from the envelopes at the separating station, and conveying the separated contents from one envelope at a time as a set to a pick-up station for presentation to an operator at a work station. When the operator removes the contents of one envelope from the pick-up station, the contents of another envelope are conveyed to that station and presented to the operator. As each envelope leaves the separating station, it is checked to verify that the contents have been removed from it.

Figure 1:
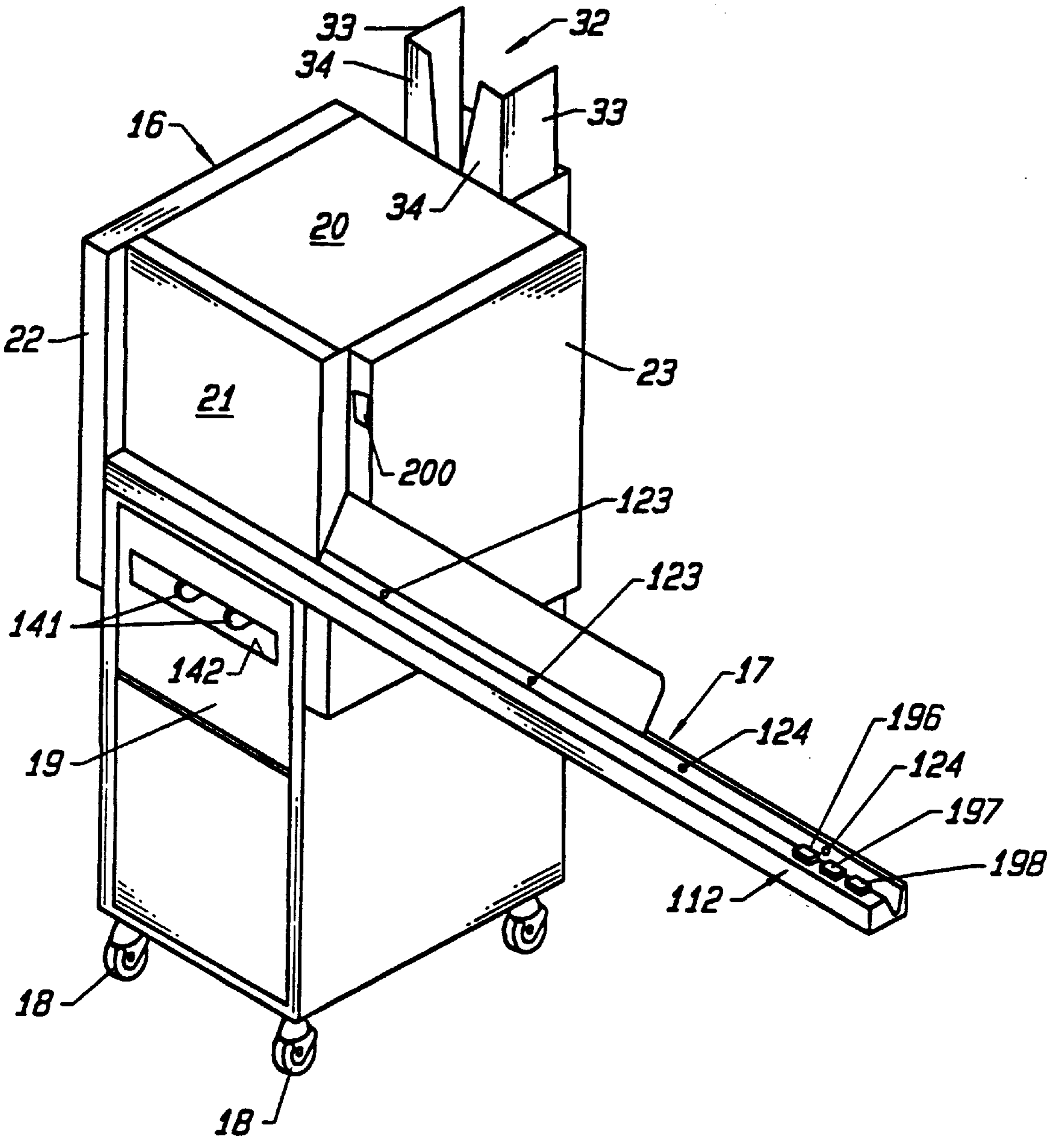
FIG. 1 is an isometric view of one embodiment of a machine for processing envelopes in accordance with the invention.

As illustrated in the drawings, the machine has a generally rectangular base cabinet 16 with an output conveyor 17 extending laterally therefrom. The base cabinet is provided with casters 18 which facilitate movement and height adjustment of the machine to position the outer end of conveyor 17 over or in front of a desk or other work station.

Cabinet 16 has a lower section with a hinged front door 19, and an upper section with a hinged top cover 20, a hinged front panel 21 and removable side covers 22, 23. The top cover is hingedly mounted to the frame of the machine along the rear edge of the cover, and it can be raised to provide access to the upper portion of the machine. The front panel is hingedly mounted at the top, and it can be raised to provide access to an output chute through which the contents of the envelopes are discharged. In one presently preferred embodiment, the top cover is fabricated of a transparent material to permit visual observation of the processing of envelopes in the upper portion of the machine.

Envelopes 31 to be processed are stacked at a input station 32 toward the rear of the machine. Before being stacked, the envelopes are cut open along one long edge thereof (e.g., the top edge or the bottom edge), and the envelopes are placed in the stack with the cut edges facing toward the front of the machine and the contents of the envelopes (e.g., checks, payment coupons, etc.) still between the front and rear panels of the envelopes.

The stack of envelopes is formed between a pair of upright guide plates 33 with inwardly extending flanges 34 along the front edges thereof. An inclined rear guide 36 urges the envelopes which are toward the bottom of the stack in a forward direction. The lateral positions of the guide plates can be adjusted to accommodate envelopes of different lengths, and the position of rear guide 36 can be adjusted to accommodate envelopes of different widths or heights.

A pair of feed rollers 37 with peripheral pads 38 are positioned beneath the forward portion of the input station for feeding the envelopes one at a time from the stack toward a cutting station 39. Pads 38 project in a radial direction from the feed rollers and have an arc length on the order of 2 inches. Upon rotation of the feed rollers in a clockwise direction, as viewed in FIG. 2, pads 38 engage the lowermost envelope in the stack and feed it in a forward direction. Separator stones 41 prevent the second envelope in the stack from moving forward with the first envelope.

Figure 2:
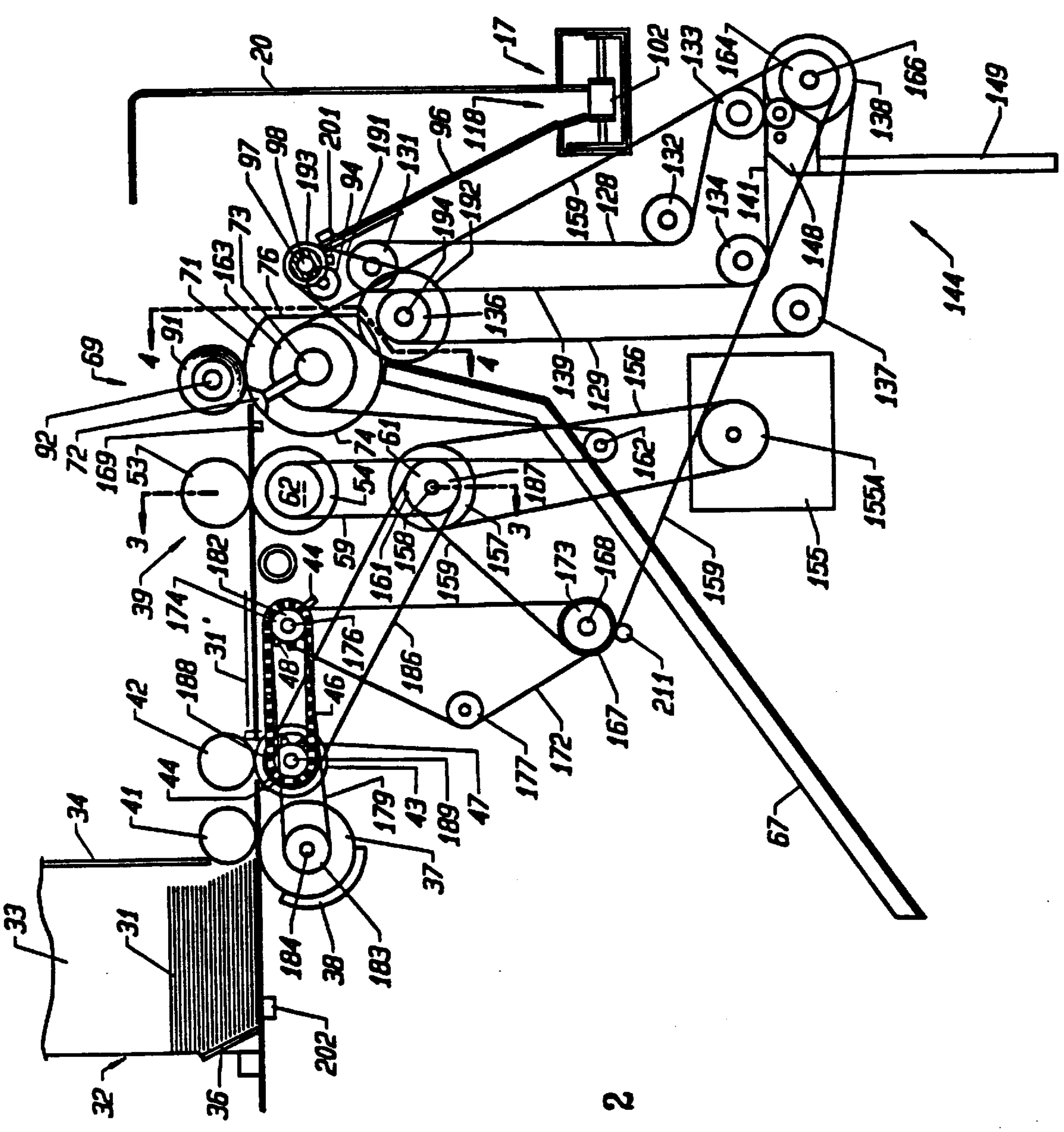
FIG. 2 is a somewhat schematic side elevational view of a portion of the machine of FIG. 1.

Pinch rollers 42, 43 receive the envelope from the feed rollers and feed it forward to a "ready" position to the rear of cutting station 39. In FIG. 2, an envelope 31' is shown in the "ready" position.

From the "ready" position, the envelopes are fed to the cutting station by lugs 44 on conveyor chains 46 which are spaced about 4.7 inches apart and positioned symmetrically on opposite sides of the centerline of the machine. The chains are trained about horizontally separated sprockets 47, 48, and the drive lugs extend from the chains in a generally perpendicular direction. As the lugs traverse the upper runs of the chains, they tend to square up the envelope in the "ready" position and push it forward into the cutting station.

The cutting station has left and right edge cutter assemblies each of which includes pinch rollers 51, 52 which receive the envelope from the conveyor chains and feed it through the cutting station. As the envelope passes through the cutting station, the end portions of the envelope are trimmed off by cutting wheels 53, 54.

Figure 3:
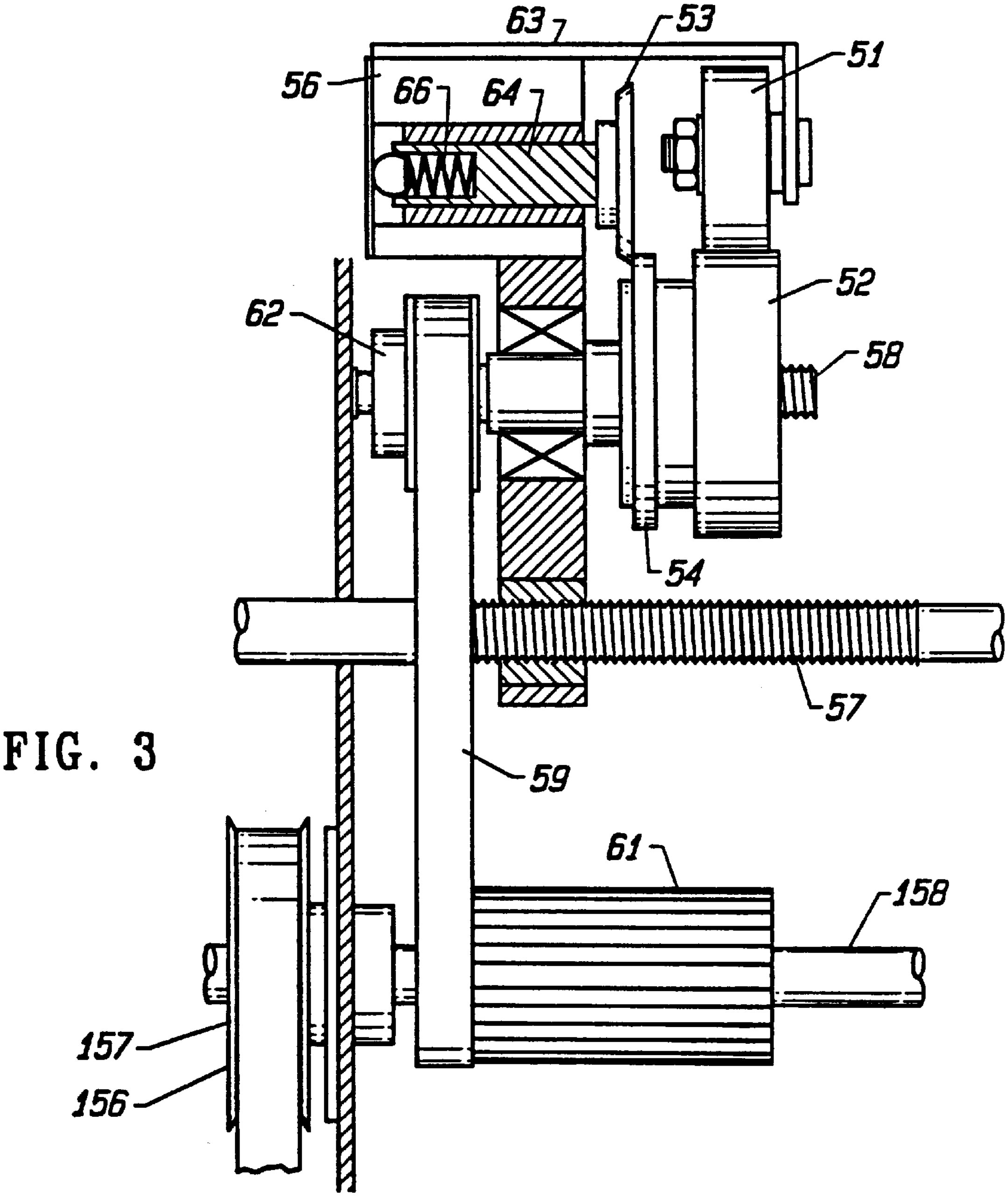
FIG. 3 is a cross-sectional view taken along line 3—3 in FIG. 2.

As illustrated in FIG. 3, the pinch rollers and cutting wheels are mounted on carriages 56 which can be adjusted laterally for envelopes of different lengths. The carriages are positioned by means of a lead screw 57 having oppositely threaded portions which engage the two carriages to move them concurrently in inward or outward directions.

On each side of the cutting station, pinch roller 52 and cutting wheel 54 are affixed to a shaft 58 which is rotatively driven by a drive belt 59 and pulleys 61, 62. Pulleys 61 are elongated, and belts 59 travel along these pulleys as the carriages are moved in and out.

Pinch roller 51 is mounted on a bracket 63 which is affixed to the carriage. Cutting wheel 53 is mounted on a floating axle 64 and is urged into facial engagement with cutting wheel 54 by a spring 66 which bears against the outer end of the axle.

A chaff chute 67 is positioned beneath the cutting station for receiving the end pieces which are cut off the envelopes. The chaff chute is inclined in a down-ward direction toward the rear of the machine, and a wastebasket or other suitable receptacle (not shown) is placed behind the machine to receive the pieces of material which drop onto the chute from the cutting station.

By the time the envelopes leave the cutting station, they have been trimmed along their leading edges and the adjacent side or end edges. Thus, the front and rear panels of the envelopes are joined together only along their trailing edges, and the two panels can be separated to provide access to the contents which are still between the panels.

Pinch rollers 51, 52 deliver the envelopes from the cutting station to a separating station 69 which is positioned immediately in front of the cutting station. At the separating station, a plurality of segmented rollers 71 and suction cups 72 are mounted on a laterally extending shaft 73 for rotation about a horizontal axis. Each of the segmented rollers has a circular peripheral surface 74 which extends through an arc length of approximately 285° and a flat surface which extends in a chordal direction between the ends of the curved surface. The suction cups are positioned between the segmented rollers, with the heads of the suction cups being aligned generally with the curved surfaces of the rollers.

Shaft 73 has an axially extending vacuum passageway 77 which communicates with passageways (not shown) in the suction cups. The application of vacuum to the suction cups is controlled by a valve assembly 78 positioned toward one end of shaft 73. The valve assembly includes a valve body 79 having a main bore 80 through which the shaft passes. An insert member 81 provides a fluid-tight seal between the stationary valve body and the rotating shaft. Vacuum is applied to the valve assembly from a vacuum pump 82 located in the lower portion of cabinet 16 through a line (not shown) connected to an inlet port 84 in the valve body. Shaft 73 has a pair of aligned radial bores 86, 87 which communicate with axial bore 77, with bore 86 being of greater diameter than bore 87. Vent openings 88, 89 are formed in the valve body and aligned with each other on opposite sides of shaft 73.

Figure 5:
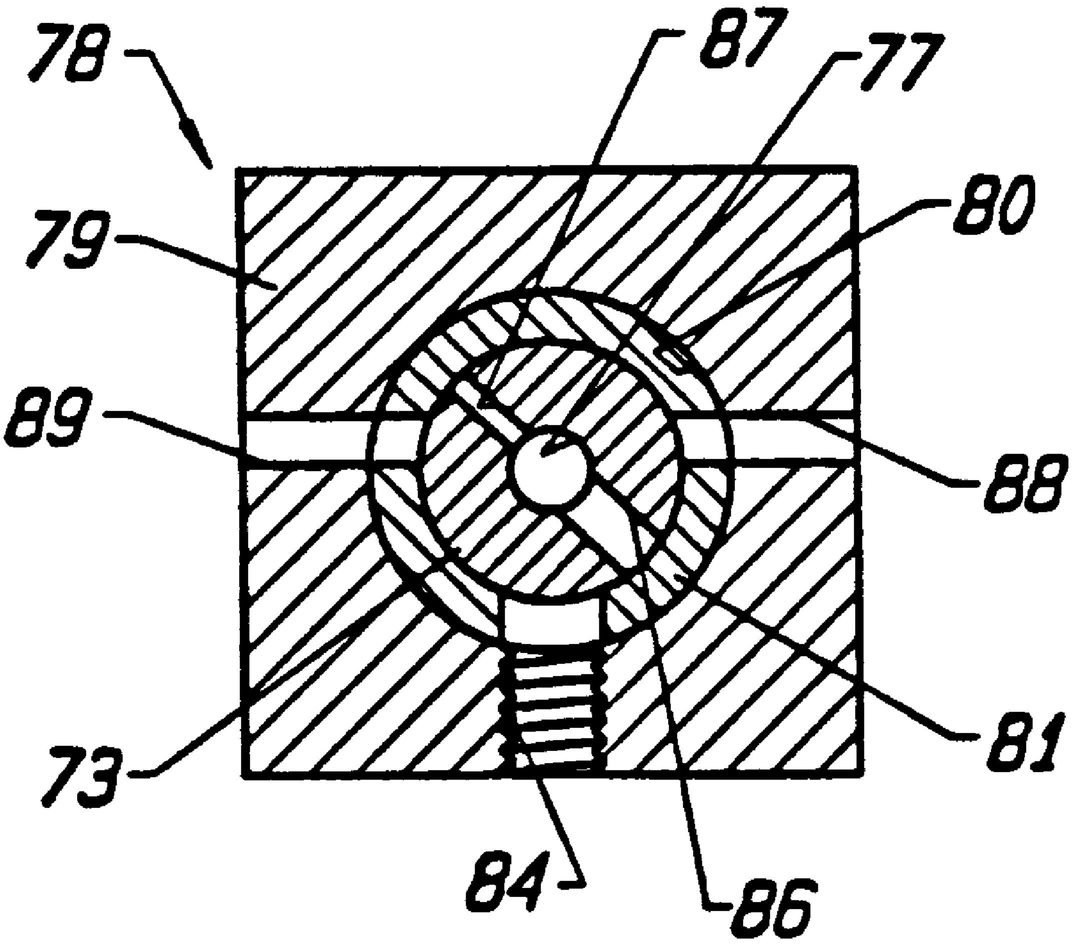
FIG. 5 is a cross-sectional view taken along line 5—5 in FIG. 4.
Figure 6:
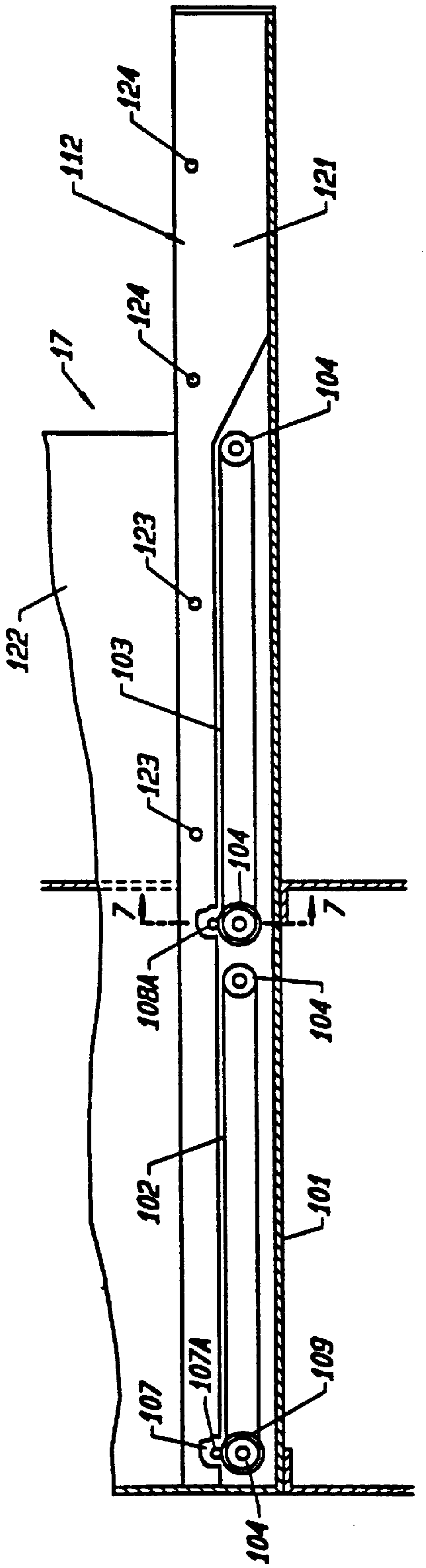
FIG. 6 is a longitudinal sectional view of the output conveyor in the embodiment of FIG. 1.
Figure 7:
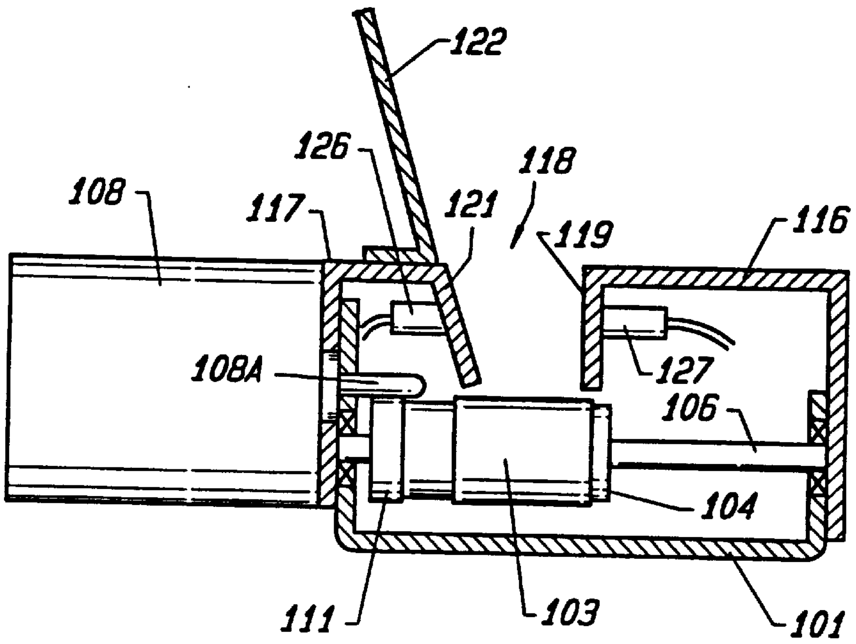
FIG. 7 is an enlarged cross-sectional view taken along line 7—7 in FIG. 6.

Shaft 73 rotates in a clockwise direction, as viewed in FIG. 5. As the shaft rotates and bore 86 is in communication with inlet port 84, vacuum is applied to the suction cups. This vacuum continues to be applied until bore 87 is in communication with vent opening 88, at which point the vacuum is released. Any vacuum applied to the suction cups as bore 87 passes inlet port 84 is released when the small bore passes vent opening 89. Thus, in the rest position of the suction cups and valve assembly, as shown in FIGS. 2 and 5, no vacuum is applied to the cups. The amount of vacuum applied to the cups is adjusted so that the lower panels of the envelopes are pulled down, but not the contents.

Figure 4:
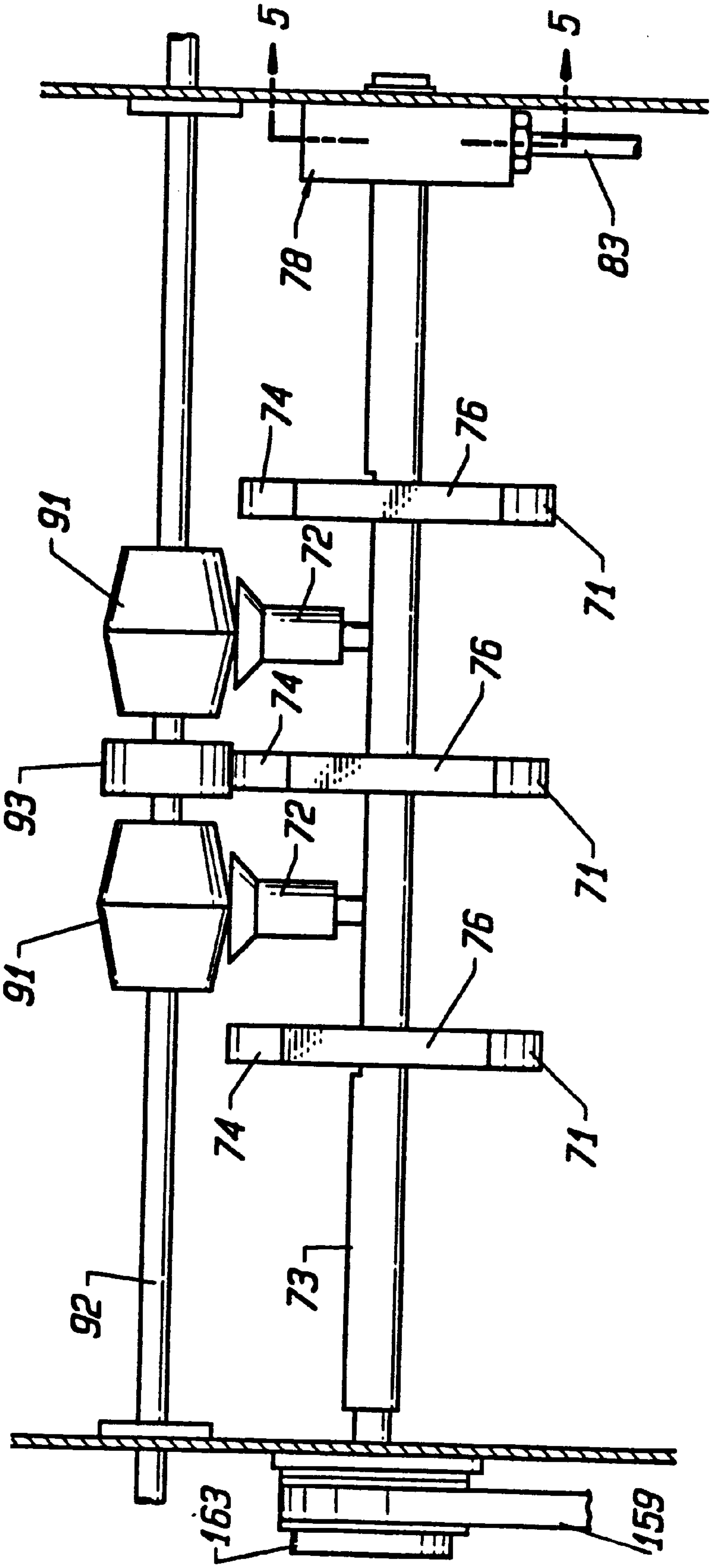
FIG. 4 is a view taken along line 4—4 in FIG. 2.

The separating station also includes a pair of crowned rollers 91 which, together with segmented rollers 71, function as corrugating rollers to stiffen the envelopes and their contents. Rollers 91 are mounted between rollers 71 on a shaft 92 which is spaced from and generally parallel to shaft 73. Each of the crowned rollers has a V-shaped peripheral surface, as best seen in FIG. 4. The crowned rollers are aligned generally with suction cups 72, and a pinch roller 93 is positioned between the crowned rollers in peripheral engagement with the curved surface of the central segmented roller 71.

A second pinch roller 94 is positioned in front of the central segmented roller 71 for peripheral engagement with the curved surface of that roller as it rotates past it. As discussed more fully hereinafter, pinch roller 93 cooperates with the segmented roller to feed envelopes into the separating station, and roller 94 cooperates with the segmented roller to feed the envelopes out of the separating station.

As the envelopes pass through the separating station, suction cups 72 pull the lower panel of the envelope in a downward direction away from the upper panel and the contents. Crowned rollers 91 stiffen the contents by corrugating them, and the stiffened contents tend to travel in a straight or horizontal direction as they leave the nip formed between pinch roller 93 and segmented roller 71, while the lower panel of the envelope is pulled in a downward direction by pinch roller 94.

An output chute 96 is positioned in front of the separating station for receiving the contents which are separated from the envelopes at that station. This chute is inclined in a downward direction toward the front of the machine.

A plurality of scrubbing rollers 97 are spaced along a laterally extending shaft 98 above the upper end of the output chute. These rollers are positioned to engage the undersides of the contents as they emerge from the separating station and facilitate their separation from the envelopes and delivery to the output chute. They are fabricated of rubber or another material having a surface with a relatively high coefficient of friction. In one presently preferred embodiment, two such rollers are provided, but any suitable number can be employed.

Output conveyor 17 is positioned beneath the lower end of discharge chute 96 for carrying the contents from the discharge chute to a work station. The conveyor has a horizontally extending frame 101 of generally U-shaped cross-section which is mounted on cabinet 16 in cantilevered fashion. The conveyor includes a pair of belts 102, 103 which are trained about rollers 104 mounted on axles 106 between the side flanges of frame 101. The belts are driven by drive motors 107, 108 mounted on the rear side of the frame with output shafts 107*a*, 108*a* in peripheral driving engagement with drive rollers 109, 111 affixed to the roller axles 106 at the input ends of the two belts. The two belts are aligned with each other, with the input end of belt 103 in proximity to the output end of belt 102 for receiving contents from belt 102. Frame 101 extends beyond the output end of belt 103, and a pick-up station is formed between the end of the belt 103 and the frame. Belt 102 thus serves to convey the contents from discharge chute 96 to belt 103, and belt 103 conveys the contents to the pick-up station for removal by an operator at the work station.

As illustrated in FIGS. 1 and 2, conveyor 17 is substantially longer than the inclined discharge chute 96 which carries the separated contents from the separating station 69 to the conveyor. Thus, the path along which the contents travel between the separating station and the work station extends horizontally for the greater portion of Its length.

The conveyor has front and rear panels 116, 117 which form a trough 118 having a vertical front wall 119 and an inclined rear wall 121 above the belts and in the pick-up station. A backrest 122 extends upwardly and rearwardly from the trough to help support the contents in a generally upright position as they are carried by the belts.

Means is provided for sensing the presence or absence of contents on belt 103 and at pick-up station 112. This means includes a first pair of optical sensors 123 positioned above the belt and a second pair of optical sensors 124 at the pick-up station. Each of the optical sensors includes a light source 126 and a sensor 127 positioned on opposite sides of the trough. Additional optical sensors (not shown) are provided for detecting the arrival of envelopes and contents at the separating station 69 and at the top of discharge chute 96.

As discussed more fully hereinafter, belt 103 runs continuously while the machine is operating, whereas belt 102 operates only upon command by the operator or when the operator removes the contents of an envelope from the pick-up station.

A pair of transport belts 128, 129 are positioned in front of and below separating station 69 for conveying the envelopes out of the machine after their contents have been removed. Belt 128 is trained about pulleys 131–134, and belt 129 is trained about pulleys 136–138 and 134. Each of the belts has a vertical run 139 and a horizontal run 141, and the belts are positioned back-to-back in these runs, with the envelopes being carried between the back-to-back portions of the belts.

The empty envelopes are discharged by belts 128, 129 in a horizontal direction through an opening 142 in the lower front panel 19 of cabinet 16. A wastebasket or other suitable receptacle (not shown) can be positioned in front of the cabinet to collect the envelopes.

Figure 8:
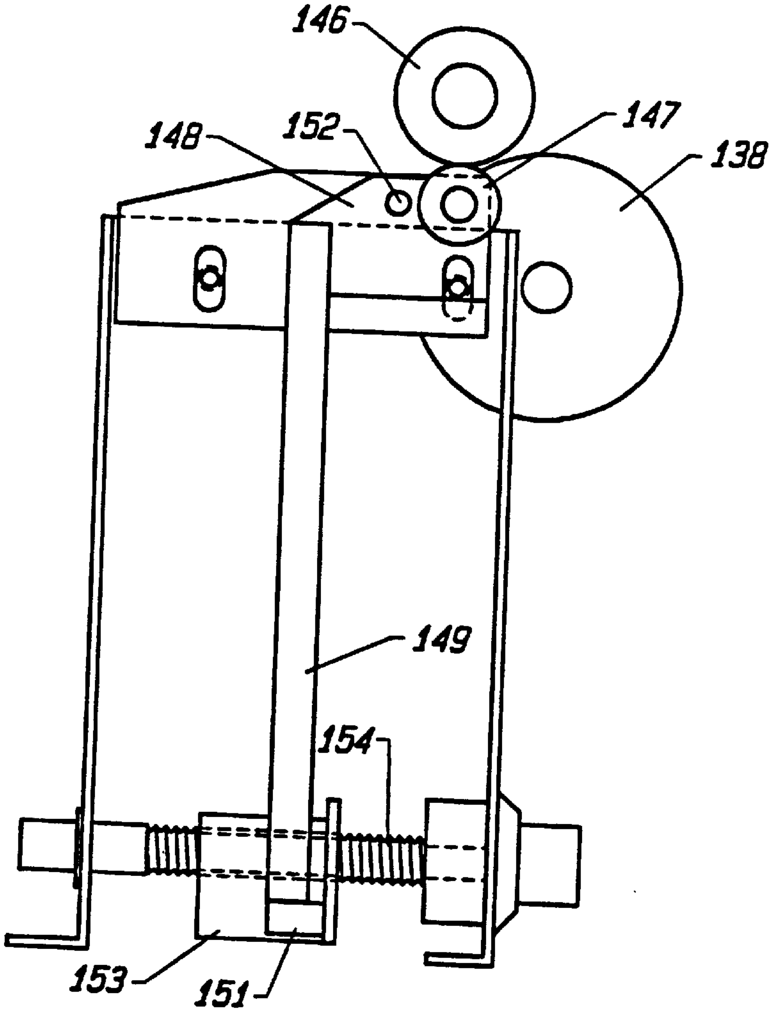
FIG. 8 is a fragmentary sectional view of the empty envelope verifier in the embodiment of FIG. 1.
Figure 9:
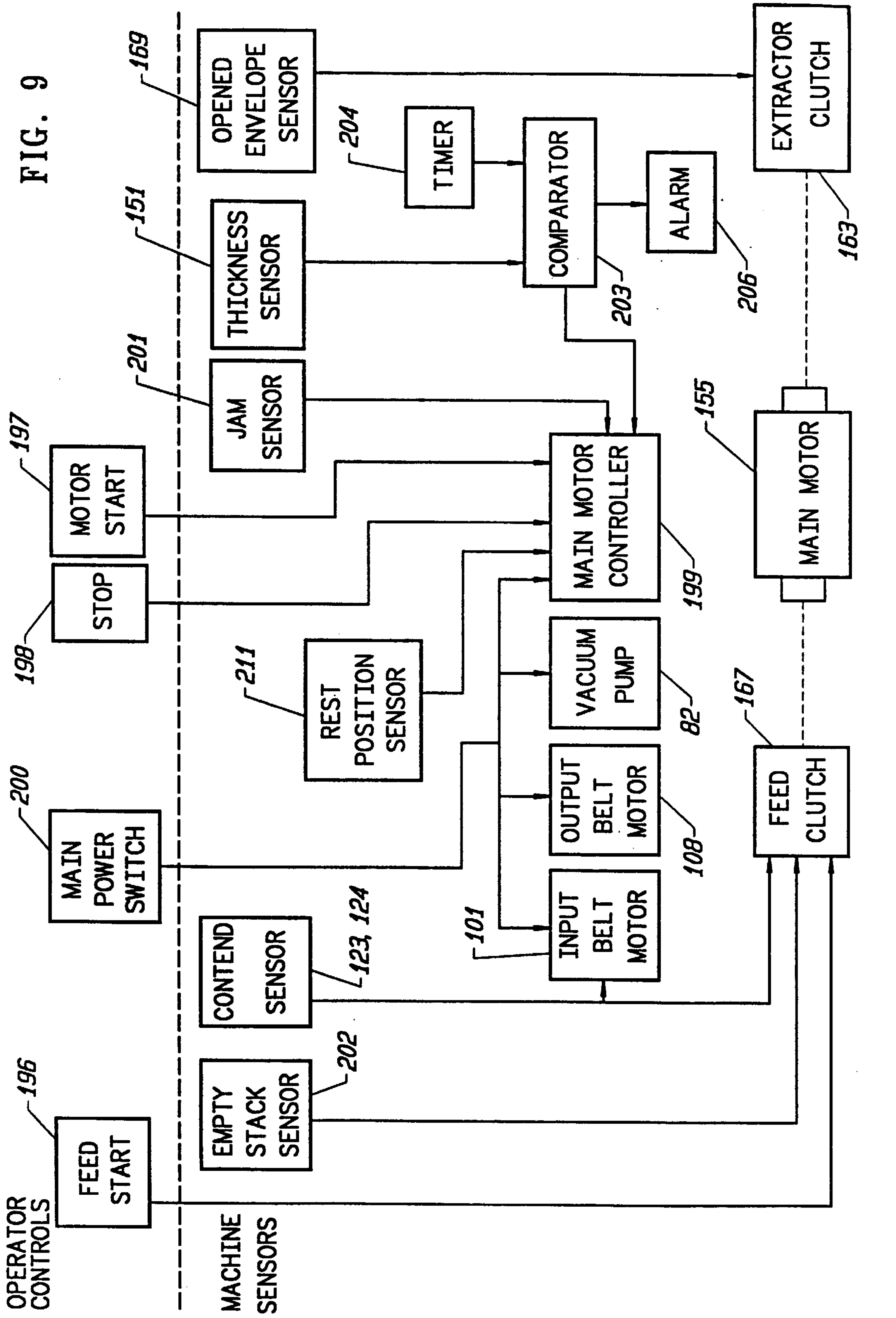
FIG. 9 is a functional block diagram of the embodiment of FIG. 1.

A verifier station 144 is positioned toward the discharge end of transport belts 128, 129 to verify that the contents have in fact been removed from the envelopes before the envelopes are discharged from the machine. As best illustrated in FIG. 8, the verifier comprises a pair of gauging rollers 146, 147 between which the envelopes pass as they are carried along the horizontal run 141 of belts 128, 129. Roller 146 is mounted in a stationary position on the frame of the machine, and roller 147 is mounted on a pivot arm 148 for deflection in accordance with the thickness of the material passing between the two rollers. The pivot arm has an elongated flag 149, and the deflection of roller 147 is monitored by an optical sensor 151 at the free end of flag 149. The arm pivots about a pin 152, and the optical sensor is mounted on a carriage 153, the position of which can be adjusted relative to the free end of flag 149 by a lead screw 154. The position of the sensor is adjusted so that the flag blocks the passage of light to the sensor when rollers 146, 147 are separated by a distance no greater than the thickness of an envelope panel. When the rollers are separated by a greater distance, the flag uncovers the sensor, and a signal is produced by the sensor.

As discussed more fully hereinafter, the duration of the signal from sensor 151 is monitored to detect the presence of contents and distinguish them from other variations in thickness such as seams in the envelopes. In this regard, the contents are generally wider than the seams, and they cause the flag to remain out of the light path longer than seams do. Therefore, by monitoring the duration of the signals from sensor 151, it is possible to distinguish between contents and seams in the envelopes without having to try to set the machine up to anticipate where the seams may occur in a given envelope.

A main drive motor 155 is mounted below cutting station 39 and seperating station 69, with a drive pulley 155a mounted on its output shaft. A drive belt 156 is trained about the drive pulley and a pulley 157 mounted on a cutter drive shaft 158. This shaft extends laterally of the machine beneath the cutting station, and the elongated drive pulleys 61 for the cutter assemblies are mounted on this shaft.

A general power distribution belt 159 is trained about a drive pulley 161 on shaft 158 and about an idler pulley 162, a single turn clutch 163 mounted on extractor shaft 73, a pulley 164 mounted on envelope transport drive shaft 166, and a single turn clutch 167 mounted on a feeder drive shaft 168. Shaft 73 rotates one turn each time clutch 163 is actuated. This clutch is of known design, and it is actuated electrically in response to an optical sensor 169 which detects the arrival of an envelope at the seperating station. The drive pulleys 138 for envelope transport belts 128, 129 are affixed to shaft 166 and are driven continuously by belt 159.

Single turn clutch 167 is similar to clutch 163, and it rotates feeder drive shaft 168 one turn each time it is actuated. This clutch is actuated in response to a signal from sensors 123, 124 when the contents from an envelope are removed from the pick-up station and the outer end of the output conveyor.

A drive belt 172 is trained about a drive pulley 173 on feeder drive shaft 168 and about a pulley 174 on a feeder shaft 176 and about an idler pulley 177. Drive sprockets 48 are mounted on shaft 176, and the conveyor chains are thus driven through one cycle each time clutch 167 is actuated.

Feed rollers 37 are driven by a belt 179 which is trained about a drive pulley 182 on shaft 176 and about a pulley 183 mounted on a shaft 184, which is the shaft on which feed rollers 37 are mounted. Being driven from shaft 176, the feed rollers are rotated one turn each time clutch 167 is actuated.

Pinch rollers 42, 43 are driven continuously by a belt 186 trained about pulleys 187, 188. Pulley 187 is mounted on cutter drive shaft 158, and pulley 188 is mounted on a shaft 189 with pinch rollers 43. Chain sprockets 47 are rotatively mounted on shaft 189 and rotate only when the conveyor chains are actuated. Scrubber rollers 97 are driven by a belt 191 which is trained about pulleys 192 and 193. Pulleys 192 are mounted on a laterally extending shaft 194, and pulley 193 is affixed to the scrubber roller shaft 98. Two of the pulleys 136 about which envelope transport belts 129 are trained are also mounted on shaft 194, and the scrubber rollers are thus driven through the transport belts.

Push button switches 196–198 are mounted on output conveyor 17 at pick-up station 112 to control the operation of the machine. Switch 196 is a FEED START switch which, through suitable logic circuits (not shown), controls feed clutch 167. Switch 197 is a MOTOR START switch which is connected to a motor controller 199 to turn on drive motor 155 when depressed. A main power ON/OFF switch 200 controls the application of power to the vacuum pump, other control circuits, and the conveyor input and output belt motors. Input belt motor 107 is further controlled by FEED START switch 196 and content sensors 123, 124 on the output conveyor. Switch 198 is a STOP switch which is connected to the motor controller and turns off drive motor 155 when depressed.

A jam sensor 201 is connected to motor controller 199 to turn off the drive motor in the event that a jam occurs in the machine. This sensor includes an optical sensor positioned near the top of output chute 96 which provides an interrupt signal to the controller in the event that an envelope or its contents should remain in this area for more than a predetermined time. Operation of the feed clutch is also inhibited in the event that there are no envelopes in the input stack, as determined by an optical sensor 202 at the input station.

The drive motor is also turned off in the event that contents are found to be present in a supposedly empty envelope carried by transport belts 128, 129. In this regard, the output of thickness sensor 151 is monitored by a comparator 203 which delivers an inhibit signal to the motor controller in the event that the sensor signal is present for more than a predetermined time, as set by a timer 204. At the same time, the comparator actuates an alarm 206 to provide an audible warning to the operator that the contents have not been removed from an envelope. The predetermined time is set to be greater than the time it normally takes for the seams of an envelope to pass between gauging wheels 146, 147.

An optical sensor 211 monitors the position of feeder shaft 168 and provides a signal when the machine is in the rest position. This signal is utilized by the motor controller to return the machine to the rest position when the machine is stopped and started.

Operation and use of the machine, and therein the method of the invention, are as follows. The machine is positioned in a convenient location near a work station, and output conveyor 17 is positioned so that pick-up station 112 is positioned within easy reach of an operator at the work station. The pick-up station can, for example, be positioned just above the top of a desk at the work station.

A stack of envelopes 31 is provided at the input station. Before being stacked, the envelopes are cut open along one edge thereof (e.g., the top edge or the bottom edge), and the envelopes are placed in the stack with the cut edges facing toward the front of the machine and the contents of the envelopes (e.g., checks, payment coupons, etc.) still between the front and rear panels of the envelopes. Main power switch 199 is actuated to turn on vacuum pump 82. MOTOR START switch 197 is depressed to turn on drive motor 155 and output belt motor 108. When these motors are turned on, pinch rollers 42, 43 turn continuously, as do scrubbing rollers 97, transport belts 128, 129 and conveyor belt 103.

To initiate the feeding of an envelope, the operator depresses FEED START switch 196, which actuates feeder clutch 167. This causes feed rollers 37 to rotate one revolution, feeding the envelope from the bottom of the input stack in a forward direction. As the envelope moves forward, it is fed to the "ready" position above conveyor chains 46 by pinch rollers 42, 43 which rotate continuously.

Actuation of feeder clutch 67 also causes conveyor chains 46 to travel through one cycle. As the chains rotate, lugs 44 move from the rest position, illustrated in full lines in FIGS. 2 and 10, into engagement with the trailing edge of the envelope, as illustrated in phantom lines in these two figures. Thereafter, as the chains continue to travel the lugs push the envelope 31' in a forward direction toward cutting station 39.

As the envelope reaches the cutting station, pinch rollers 51, 52 continue to feed it in the forward direction, and cutting wheels 53, 54 trim the ends off the envelope. The pieces which are cut off the ends of the envelopes drop onto chaff chute 67 and are carried out of the machine to a wastebasket or other suitable receptacle positioned to the rear of the machine.

When the envelope leaves the cutting station, it has been trimmed along its leading edge and along the adjacent side or end edges. Thus, the front and rear panels of the envelope are joined together only along the trailing edge, and the contents are still between the panels.

Figure 10:
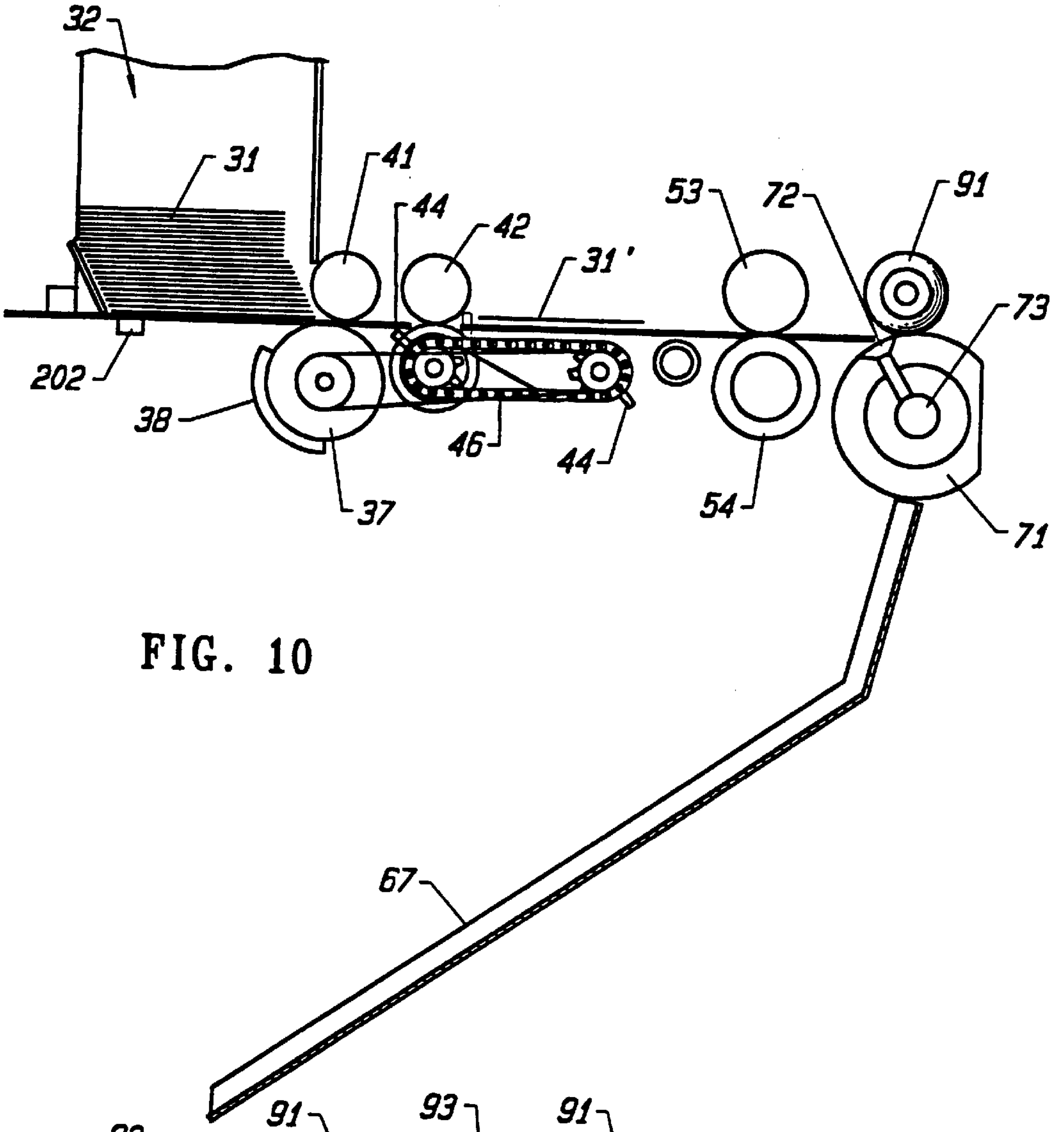
FIGS. 10–13 are operational views of the embodiment of FIG. 1.
Figure 11:
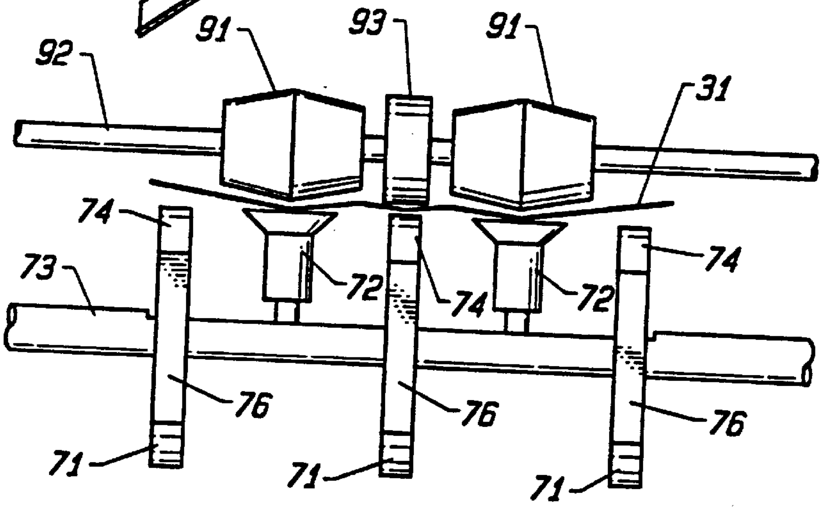

As the opened envelope moves toward the seperating station, it is detected by sensor 169, clutch 163 is actuated to rotate shaft 73 and the extraction rollers. As the envelope enters the separating station, segmented rollers 71 and suction cups 72 are oriented as shown in FIG. 10. Shaft 73 rotates in the clockwise direction, as viewed in FIG. 10, and the envelope and contents are feed through the seperating station by the central segmented roller 71 and pinch roller 93. As the envelope passes between the rollers, both the envelope and its contents tend to be corrugated by crowned rollers 91, as illustrated in FIG. 11.

Figure 12:
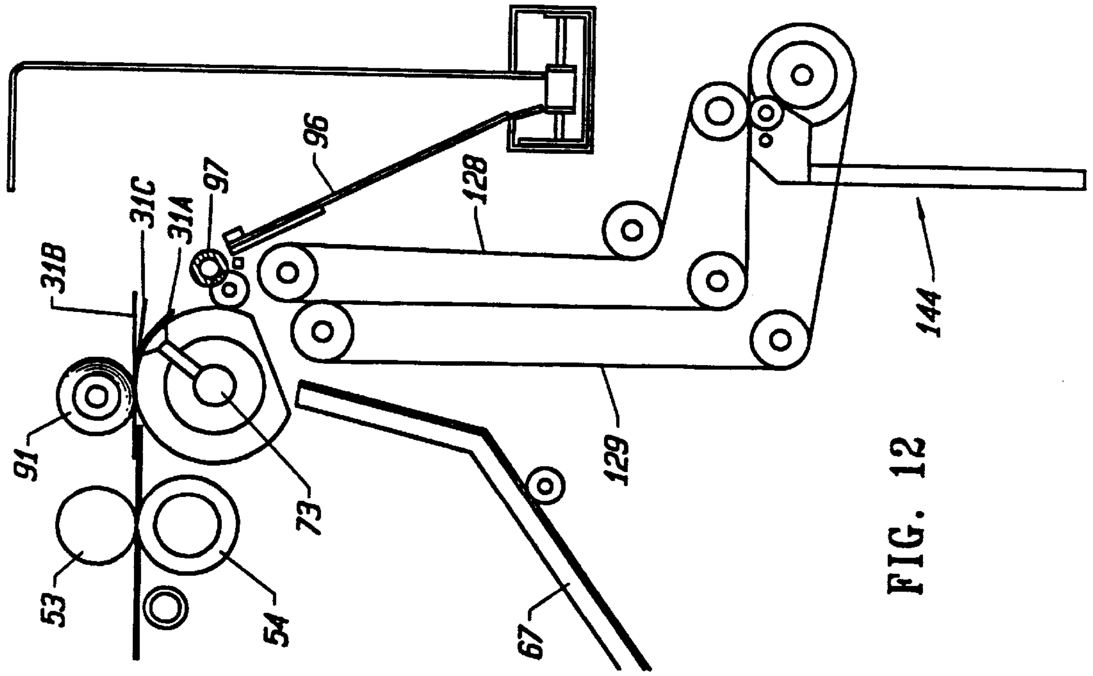

As shaft 73 starts to rotate, suction cups 72 move into engagement with the lower panel of the envelope, and vacuum is applied to the suction cups. As the shaft continues to rotate, the suction cups pull the lower panel 31*a* of the envelope in a downward direction away from the upper panel 31*b* and the contents 31*c*, as illustrated in FIG. 12. The corrugating action of rollers 91 imparts some rigidity to the upper panel and the contents, and they tend to travel in a straight direction, passing above scrubbing rollers 98.

As the trailing edge of the envelope moves past the nip formed between rollers 71, 93, the contents are free to drop down output chute 96. The clockwise rotation of the scrubbing rollers (as viewed in FIG. 12) helps to separate the contents from the upper panel of the envelope.

The contents which drop down output chute 96 drop onto conveyor belt 102. This belt remains in a stationary position as long as the contents from a previous envelope are present at pick-up station 112. When the contents are removed from the pick-up station, belt 102 is actuated to carry the contents from the discharge chute to belt 103. Belt 103 runs continuously, carrying the contents to the pickup station. The removal of contents from the pickup station also actuates feeder clutch 167 to cause another envelope to be fed through the machine from input stack 31.

Since belt 102 remains stationary as the contents drop onto it, all of the contents from a given envelope should arrive at the pick-up station together even though they may drop down the discharge chute at different times. Thus, for example, if an envelope contains both a payment coupon and a check, the coupon and the check should be presented to the operator together at the pick-up station.

Figure 13:
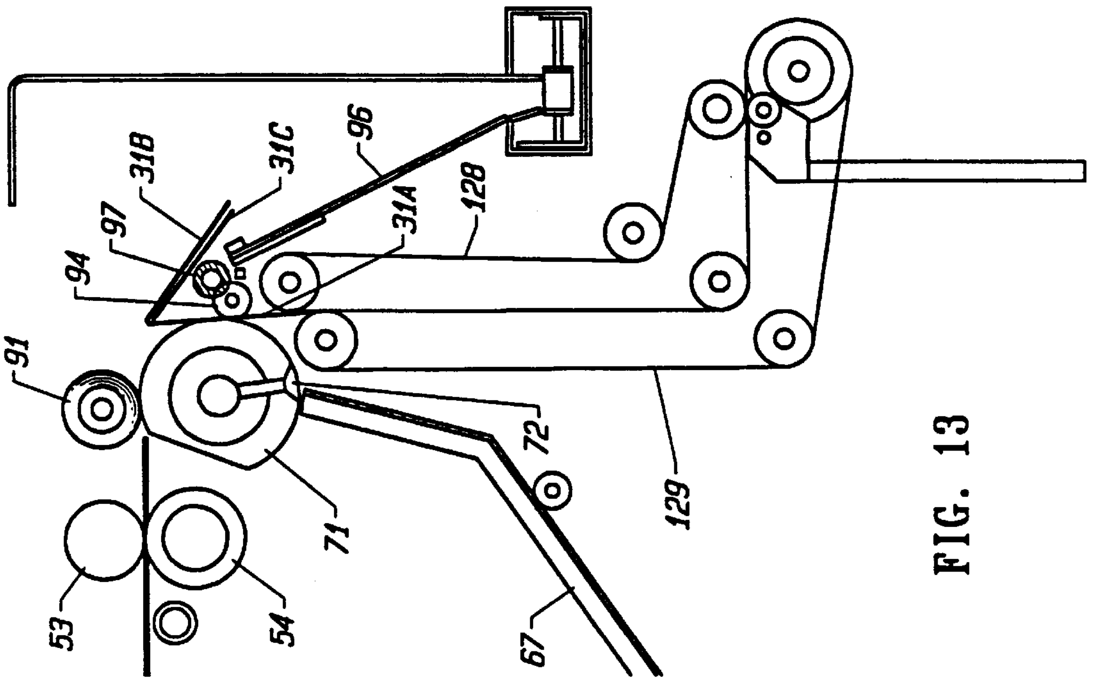

While the contents from an envelope drop down the pick-up chute, the leading edge of the lower panel of the envelope passes between pinch rollers 94 and the segmented rollers and is captured between transport belts 128, 129, as illustrated in FIG. 13. As the envelope is drawn between the belts, the vacuum is released from the suction cups, and the flat sides 76 of the segmented rollers come around to release the envelope from pinch rollers 94.

As the envelope travels between belts 128, 129 toward the discharge opening 142 in the front panel of the machine, it passes between the gauging rollers at verifier station 144. If contents are detected at this station, the drive motor is turned off, and an alarm is sounded, advising the operator to check the envelope at the output window for contents. If no contents are detected, the motor continues to operate, and the empty envelope drops into a receptacle at the front of the machine.

The machine is thus fully controlled by the operator, and it presents the operator with the complete set of contents from one envelope at a time on a demand basis. In this regard, it will be noted that each time the operator removes the contents of one envelope from the pick-up station, the machine is actuated to deliver the contents from another envelope to the operator.

It is apparent from the foregoing that a new and improved machine and method for extracting contents from envelopes have been provided. While only certain presently preferred embodiments have been described in detail, as will be apparent to those familiar with the art, certain changes and modifications can be made without departing from the scope of the invention as defined by the following claims.

We claim:

1. A method of extracting contents from envelopes with an extracting machine and delivering the extracted contents to a work station positioned to one side of the machine, comprising the steps of stacking envelopes to be processed at an input station, feeding the envelopes one at a time from the input station to a cutting station, severing the envelopes along edge portions thereof at the cutting station to provide access to the contents, transporting the envelopes from the cutting station to a separating station, separating the contents from the envelopes at the separating station, conveying the separated contents from one envelope at a time along a horizontally extending path to the work station at one side of the machine, detecting the presence/absence of contents at the work station, and conveying the contents from a second envelope to the work station when the contents from a first envelope are removed at the work station.

2. A method of extracting contents from envelopes with an extracting machine and delivering the extracted contents to a work station positioned to one side of the machine, comprising the steps of stacking envelopes to be processed at an input station, feeding the envelopes one at a time from the input station to a cutting station, severing the envelopes along edge portions thereof at the cutting station to provide access to the contents, transporting the envelopes from the cutting station to a separating station, separating the contents from the envelopes at the separating station, and conveying the separated contents from one envelope at a time along a horizontally extending path to the work station at one side of the machine by receiving the contents from one envelope on a stationary first conveyor, actuating the first conveyor to carry the contents to a transfer station in response to removal of contents of a previous envelope at the work station, transferring the contents from the first conveyor to a second conveyor at the transfer station, and carrying the contents on the second conveyor from the transfer station to the work station.

3. A method of extracting contents from envelopes with an extracting machine and delivering the extracted contents to a work station positioned to one side of the machine, comprising the steps of stacking envelopes to be processed at an input station, feeding the envelopes one at a time from the input station to a cutting station, severing the envelopes along edge portions thereof at the cutting station to provide access to the contents, transporting the envelopes from the cutting station to a separating station with the contents positioned between front and rear panels of the envelopes as they enter the separating station, separating the contents from the envelopes at the separating station by passing the envelopes between corrugating rollers to impart a stiffness to the panels and to the contents, engaging one of the panels with a suction cup and rotating the suction cup about an axis generally parallel to the panels for drawing the one panel away from the other panel and the contents, and conveying the separated contents from one envelope at a time along a horizontally extending path to the work station at one side of the machine.

4. The method of claim 3 further including the steps of receiving the panel from the suction cup between a pair of belts, and carrying the envelope away from the contents with the belts.

5. A method of extracting contents from envelopes with an extracting machine and delivering the extracted contents to a work station positioned to one side of the machine, comprising the steps of stacking envelopes to be processed at an input station, feeding the envelopes one at a time from the input station to a cutting station, severing the envelopes along edge portions thereof at the cutting station to provide access to the contents, transporting the envelopes from the cutting station to a separating station, separating the contents from the envelopes at the separating station, conveying the separated contents from one envelope at a time along a horizontally extending path to the work station at one side of the machine, gauging the thickness of each envelope as each envelope passes a checking station, and determining whether the thickness gauged exceeds a predetermined amount for more than a predetermined time as the envelope passes the checking station.

6. A method of extracting contents from envelopes and delivering the extracted contents to a work station, comprising the steps of: stacking envelopes at an input station, feeding the envelopes one at a time from the input station to a cutting station, severing the envelopes along edge portions thereof at the cutting station to provide access to the contents, transporting the envelopes from the cutting station to a separating station, separating the contents from the envelopes at the separating station, delivering the contents of one envelope from the separating station to a stationary first conveyor, actuating the first conveyor to carry the contents of the one envelope to a transfer station in response to removal of contents of a previous envelope at the work station, transferring the contents from the first conveyor to a continuously moving conveyor at the transfer station, and carrying the contents on the continuously moving conveyor from the transfer station to the work station.

7. The method of claim 6 wherein the contents are positioned between front and rear panels of the envelopes as they enter the separating station, and the contents are separated from the envelopes by passing the envelopes between corrugating rollers to impart a stiffness to the panels and to the contents, engaging one of the panels with a suction cup, and rotating the suction cup about an axis generally parallel to the panels for drawing the one panel away from the other panel and the contents.

8. The method of claim 7 further including the steps of receiving the panel from the suction cup between a pair of belts, and carrying the envelope away from the contents with the belts.

9. The method of claim 6 including the step of checking the envelopes leaving the separating station to verify that the contents have been removed.

10. The method of claim 6 wherein the envelopes are checked by gauging the thickness of each envelope as each envelope passes a checking station, and determining whether the thickness gauged exceeds a predetermined amount for more than a predetermined time as the envelope passes the checking station.

11. In a method of extracting contents from envelopes which have been severed along edge portions thereof and delivering the extracted contents to a work station, the steps of: separating the contents from the envelopes at a separating station, conveying the separated contents along a path which extends between the separating station and a work station positioned to one side of the separating station, the greater portion of the path length being horizontal, presenting the contents from one envelope at a time at the work station, detecting the removal of contents at the work station, and conveying the contents from a second envelope to the work station when the contents from a first envelope are removed.

12. The method of claim 11 including the steps of delivering the contents to a stationary conveyor after they are separated from the envelopes, actuating the conveyor to deliver contents from a second envelope to a continuously moving conveyor when the contents from a first envelope are removed at the work station, and delivering the contents from the second envelope to the work station on the continuously moving conveyor.

13. In a method of removing contents from between front and rear panels of envelopes and delivering the removed contents to a work station, the steps of: stacking the envelopes at an input station, feeding the envelopes one at a time from the input station to a cutting station, severing the envelopes along edge portions thereof at the cutting station to permit separation of the front and rear panels, transporting the envelopes from the cutting station to a separating station, engaging the front and rear panels of the envelopes with corrugating rollers at the separating station for imparting a stiffness to the panels and the contents, engaging one of the panels of each envelope at the separating station with a vacuum cup, rotating the vacuum cup about an axis generally parallel to the panels for separating the one panel from the other panel and the contents, exerting a pull on the one panel to move the envelope away from the contents, and delivering the contents from the separating station to the work station.

14. The method of claim 13 including the step of checking the envelopes leaving the separating station to verify that the contents have been removed.

15. The method of claim 14 wherein the envelopes are checked by gauging the thickness of each envelope as each envelope passes a checking station, and determining whether the thickness gauged exceeds a predetermined amount for more than a predetermined time as the envelope passes the checking station.

16. In a method of extracting contents from envelopes and delivering the extracted contents to a work station, the steps of: stacking the envelopes at an input station, feeding the envelopes one at a time from the input station to a cutting station, severing the envelopes along edge portions thereof at the cutting station to provide access to the contents, transporting the envelopes from the cutting station to a separating station, separating the contents from the envelopes at the separating station, delivering the contents from the separating station to the work station, and checking the thickness of envelopes leaving the separating station to verify that the contents have been removed therefrom by gauging the thickness of each envelope as each envelope passes a checking station and determining whether the thickness gauged exceeds a predetermined amount for more than a predetermined time as the envelope passes the checking station.

17. In a method of processing envelopes and contents thereof, the steps of: feeding the envelopes one at a time past a gauging element at a predetermined speed so that each envelope contacts the gauging element and deflects the gauging element in accordance with the thickness of the envelope and any contents therein as the envelope moves past the gauging element, and providing an output signal in the event that the gaging element is displaced by a predetermined amount for a predetermined time by delivering a displacement signal when the gauging element is displaced by the predetermined amount, and delivering the output signal when the displacement signal is present for more than the predetermined time.

18. In a method of removing contents from envelopes having front and rear panels which have been severed along three adjacent edges and remain connected along a fourth edge, the steps of: corrugating the panels and the contents along lines generally perpendicular to the fourth edge to impart a stiffness to the panels and the contents, drawing one of the corrugated panels along a first path away from the other corrugated panel, and feeding the corrugated contents along a second path to separate the contents from the envelope.

19. The method of claim 18 wherein the one of the corrugated panels is drawn away by engaging the panel with a vacuum actuated holding element, and rotating the holding element about an axis parallel to the fourth edge of the panels to separate the panels and thereby open the envelope in book-like fashion.

20. The method of claim 19 further including the step drawing the two panels away from the holding element as a unit along the first path.

21. The method of claim 18 including the step of engaging the contents with a rotating scrubber roller to urge the contents toward the second path when the one panel has been drawn away.

* * * * *